(12) United States Patent
Nakayama et al.

(10) Patent No.: US 7,663,792 B2
(45) Date of Patent: Feb. 16, 2010

(54) REFLECTION MIRROR UNIT IN IMAGE READING DEVICE AND IMAGE READING DEVICE USING THE SAME

(75) Inventors: Motoaki Nakayama, Yamanashi (JP); Kenichi Yui, Koufu (JP); Tatsuyuki Sasaki, Toyokawa (JP)

(73) Assignee: Nisca Corporation, Minamikoma-gun, Yamanashi (JP)

( * ) Notice: Subject to any disclaimer, the term of this patent is extended or adjusted under 35 U.S.C. 154(b) by 419 days.

(21) Appl. No.: 11/826,855

(22) Filed: Jul. 19, 2007

(65) Prior Publication Data

US 2008/0018971 A1     Jan. 24, 2008

(30) Foreign Application Priority Data

Jul. 20, 2006   (JP)   ............................. 2006-198593
Aug. 21, 2006   (JP)   ............................. 2006-223846

(51) Int. Cl.
    *G02B 26/08*   (2006.01)
(52) U.S. Cl. .................................................. 359/212.1
(58) Field of Classification Search .............. 359/198.1, 359/212.1
    See application file for complete search history.

(56) References Cited

U.S. PATENT DOCUMENTS 5,081,544 A *   1/1992   Kikuchi et al. ........... 359/212.1
6,862,032 B2 *  3/2005   Haginoya et al. ........... 347/129

FOREIGN PATENT DOCUMENTS

JP      H01-116662 A1   5/1989
JP      2004-077851 A1  3/2004

* cited by examiner

*Primary Examiner*—Euncha P Cherry
(74) *Attorney, Agent, or Firm*—Manabu Kanesaka

(57) ABSTRACT

A reflection mirror unit for a document on a platen includes first and second reflection mirrors, a base frame formed of a plate member and having a sliding portion adapted to slidably engage a guide rail located in a sub-scanning direction for the document on the platen, and a mirror support frame formed of a plate member. The mirror support frame includes a mirror mounting portion for supporting the first and second reflection mirrors opposite to each other with a predetermined angle. First and second coupling portions are formed on the base frame and the mirror support frame to couple together.

9 Claims, 11 Drawing Sheets

Fig. 11(a) PRIOR ART
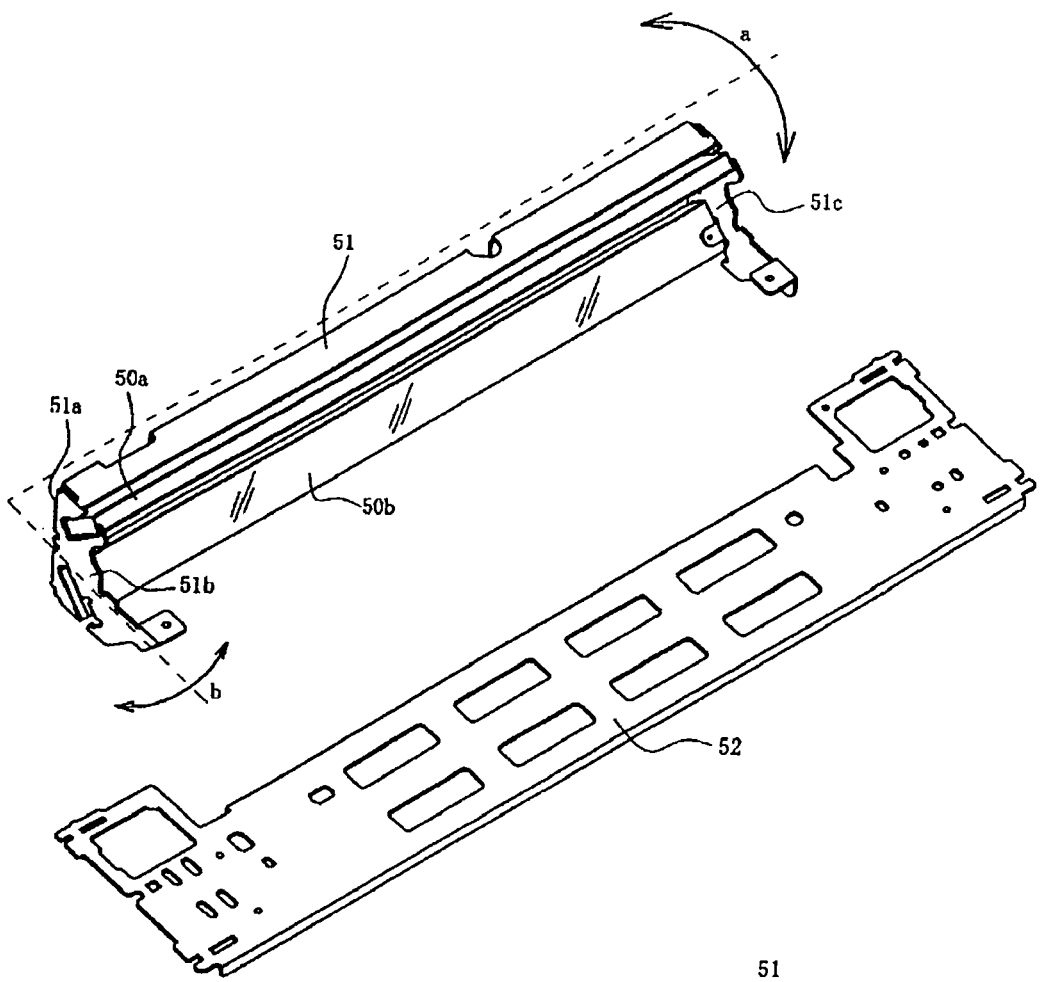
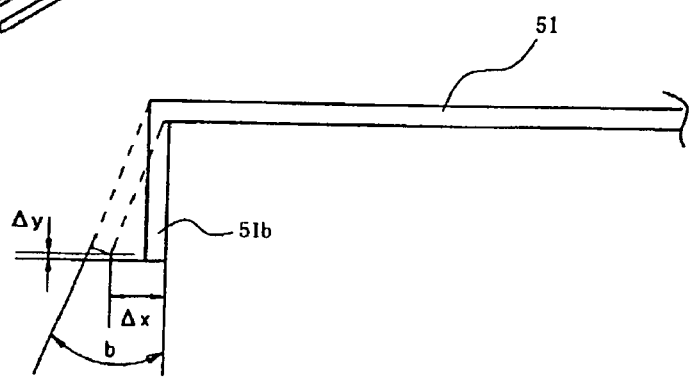
Fig. 11(b) PRIOR ART

REFLECTION MIRROR UNIT IN IMAGE READING DEVICE AND IMAGE READING DEVICE USING THE SAME

BACKGROUND OF THE INVENTION AND RELATED ART STATEMENT

The present invention relates to a reflection mirror in an image reading device for a scanner apparatus, a copier, a facsimile machine, or the like which optically reads document images, and in particular, to improvements in a reflection mirror unit for an image reading device in which an optical system such as a light source or a mirror reciprocates under a document on a platen for scanning.

In general, in image reading devices for scanner apparatuses, copiers, and facsimile machines, a document placed on a plate is irradiated with light from a light source to form reflected light from the document into an image, which is then electrically read. A line sensor is used as a photoelectric conversion element, and a line light source is used as a light source. The light source is allowed to perform a scanning operation in a sub-scanning direction along the document to read the planar image.

In order for an image forming optical system to read such a document image in order of lines, it is necessary to move, in a sub-scanning direction, the light source and a refection mirror guiding reflected light from the document to the photoelectric conversion element. The light source and the reflection mirror are mounted on a carriage that can reciprocate along the document surface so that the movement of the carriage allows the document surface to be scanned. In this case, in a known device, the light source and the reflection mirror are mounted on a single carriage to constitute an image forming optical system. Another device has a first carriage and a second carriage. The light source is mounted one of the first and second carriages, while the reflection mirror is mounted on the other carriage. The first and second carriages are moved to constitute an image forming optical system.

In any of the above device configurations, the device is generally configured to have a thin, flat shape, and further designed to irradiate a document on the platen located at the top of the device with light from the light source and use the reflection mirror to reflect reflected light so as to form an optical path in a longitudinal direction (horizontal direction) of the device. For example, Japanese Patent Publication No. 1-116662 (TOKKAI) discloses a device having a first carriage equipped with a light source lamp and a first reflection mirror that polarizes reflected light from a document, and a second carriage equipped with a second reflection mirror and a third reflection mirror which polarize light from the first reflection mirror. In this scanning device, the first and second carriages are supported so as to be moved along a platen. A driving motor moves the first carriage at a predetermined speed and moves the second carriage at a speed half of the predetermined speed of the first carriage. A condensing lens forms an image on a photoelectric element located on a device substrate.

Similarly, Japanese Patent Publication No. 2004-77851 (TOKKAI) discloses a device corresponding to the above configuration which additionally has a carrier frame slidably supported by a guide rail and a mirror supporting frame that supports the pair of reflection mirrors mounted on the second carriage, and the carrier frame and mirror supporting frame are composed of individual sheet metal members and integrated together by screws.

When the paired reflection mirrors are integrated into a unit that is movable along the platen as described above, the mirror supporting frame is conventionally mounted on a base frame carrying the unit and slidably supported by the guide rail, as disclosed in Japanese Patent Publication No. 2004-77851 (TOKKAI). The two separate frames are used to support the pair of reflection mirrors because dimensional precision can be prevented from varying, and it facilitates positional adjustments during assembly of a metal material in order to rigidly construct the unit and determine a position, in this case, by press-working, where the mirrors are supported.

For example, as shown in FIG. 11(a), if a pair of reflection mirrors 50a, 50b is prevented from being mounted on a mirror support frame 51 at a predetermined angle in the correct posture, the optical path may be bent. If the mirror support frame 51 is not accurately mounted on a base frame 52 at the correct position during the scanning movement, the mirrors may be vibrated or the optical path direction may be shifted. Thus, the mirror support frame 51 comprises a stay like frame 51a having bent pieces 51b, 51c at the opposite ends thereof which are bent by press-working and to which the respective ends of each reflection mirror are mounted by positioning the ends at corresponding surface references. The mirror support frame 51 is fixed to the base frame 52 with screws.

When the reflection mirror unit is constructed by connecting the two frame members together as described above, a machining operation is easy. Further, since the bent pieces, to which the refection mirrors are mounted, are integrally formed by press-working, for example, the positions of a right mirror attachment portion and a left mirror attachment portion need not be adjusted, and this configuration results in easy assembly. If this assembly method is employed to the conventional technique, since the mirror support frame is fixed to the base frame with screws or the like as described in Patent Document 2, the mirror support frame may be mounted so as to incline in the direction of arrow a in the figure (see FIG. 11(a)).

The bent pieces, which simultaneously support the mirrors, are likely to be bent in the direction of arrow b (see FIG. 11(b)). Consequently, when the right and left bent pieces are bent during assembly or the like, the reflection mirrors may disadvantageously mounted at a slant. When the two frames are bent at the mounting positions during a connection operation, the reflection mirrors are prevented from being placed at the accurate positions in the correct postures. This may bend the optical path or change the radius of curvature, disadvantageously distorting a read image. Thus, tilting the pair of reflection mirrors in the direction of arrow a may blur the document image or distort the read image. Further, misalignment in the direction of arrow b leads to misalignment in the sub-scanning direction shown by $\Delta y$, resulting in a blurred or distorted image. This may in turn result in misalignment in the main scanning direction shown by $\Delta x$ in the figure, causing an image reading start position to deviate from the correct position. In particular, it is difficult to form the surface of each mirror perfectly flat, and the surface of the mirror normally tends to have an insignificant aberration in a central region, but it tends to have a significant aberration in a peripheral portion. Thus, a very difficult operation needs to be performed in order to assemble the mirrors while preventing the misalignment of the center position of the mirror during assembly.

It is thus a main object of the present invention to provide a reflection mirror unit that, when a mirror support frame carrying a pair of reflection mirrors is connected to a base frame supported by a guide rail, enables the reflection mirrors to be held at accurate positions in correct postures in the main scanning direction and in the sub-scanning direction.

It is another object of the present invention to provide a reflection mirror unit in which a mirror support frame carrying a pair of reflection mirrors is composed of a relatively thin plate of metal or the like, which enables the reflection mirrors to be reliably held, as well as an image reading device using the reflection mirror unit.

Further objects and advantages of the invention will be apparent from the following description of the invention.

SUMMARY OF THE INVENTION

According to a first aspect of the present invention, a pair of reflection mirrors is supported on bent pieces provided at opposite ends of a mirror support frame in a main scanning direction. When a base frame with the mirror support frame mounted thereon is slidably supported on a guide rail located in a sub-scanning direction, slit-like fitting holes formed on the base frame are engaged with respective slit-like recessed grooves formed on the mirror support frame to connect the two frames together. Each of the slit-like fitting holes comprises sandwiching sidewall surfaces, defining a distance between the opposite bent pieces in the main scanning direction, and an abutting surface, defining a position in the sub-scanning direction. The slit-like recessed grooves are formed to define the vertically opposite positions of the first and second reflection mirrors. This structure allows the pair of reflection mirrors to be configured as a unit mounted at the accurate position in the accurate posture.

As a result, the reflection mirrors supported on the lateral pair of bent pieces are prevented from being laterally tilted because the slit-like recessed grooves in the bent pieces are positioned on the abutting surface formed on the corresponding slit-like fitting hole on the base frame. Further, the distance (span) between the opposite bent pieces in the main scanning direction is defined by the sandwiching sidewall surfaces of the slit-like fitting holes. This structure prevents the pair of bent pieces from being bent when mounted to the base frame. Furthermore, the vertical positions of the pair of reflection mirrors are defined by the slit-like recessed grooves formed on the bent pieces, when the reflection mirrors are mounted on the base frame.

Consequently, the pair of reflection mirrors is prevented from being tilted forward or backward in the sub-scanning direction to the base frame supported by the guide rail member, or being mounted on the base frame and biased forward or backward in the main scanning direction or in the vertical direction. Since the mirror support frame and the base frame are combined together by fitting the slit-like fitting holes and the slit-like recessed grooves, the mirrors are rigidly held, and the frames can be formed to be thinner and lighter. The first aspect of the present invention achieves these significant results.

According to a second aspect of the present invention, the pair of reflection mirrors is fixedly positioned at coupling portions formed on the base frame, which is slidably engaged with the guide rail, extending in the sub-scanning direction. Thus, integrally pressing metal plates or other plate-like members into the base frame allows the sliding portions and coupling portions of the base frame to be formed in an accurate positional relationship. Further, the pair of reflection mirrors can be mounted on the base frame at the accurate positions in the correct postures.

Moreover, a main-scanning-direction reading reference end surface of each reflection mirror is fixedly positioned on the base frame via the bent pieces, formed on the mirror support frame. The opposite end surface of the reflection mirror is fixedly positioned on the base frame via a bracket member mounted on the mirror support frame so as to be position-adjustable. This configuration allows the first and second reflection mirrors to be mounted on the base frame in postures corresponding to the main-scanning-direction reading reference so as to be rigidly protected by the mirror support frame.

Therefore, the pair of reflection mirrors is prevented from being tilted, forward or backward in the sub-scanning direction, to the base frame supported by the guide rail member or being mounted on the base frame and biased in the main scanning direction. Moreover, even when the mirror support frame is formed to be thinner and lighter, the reflection mirrors are rigidly held at the accurate position by the base frame. The second aspect of the present invention achieves these significant results.

BRIEF DESCRIPTION OF THE DRAWINGS

FIGS. 11(*a*) and 11(*b*) are diagrams showing the configuration of a conventional reflection mirror unit, wherein FIG. 11(*a*) is an exploded view of the reflection mirror unit, and FIG. 11(*b*) is a diagram illustrating distortion of a frame.

DETAILED DESCRIPTION OF PREFERRED EMBODIMENTS

Figure 1:
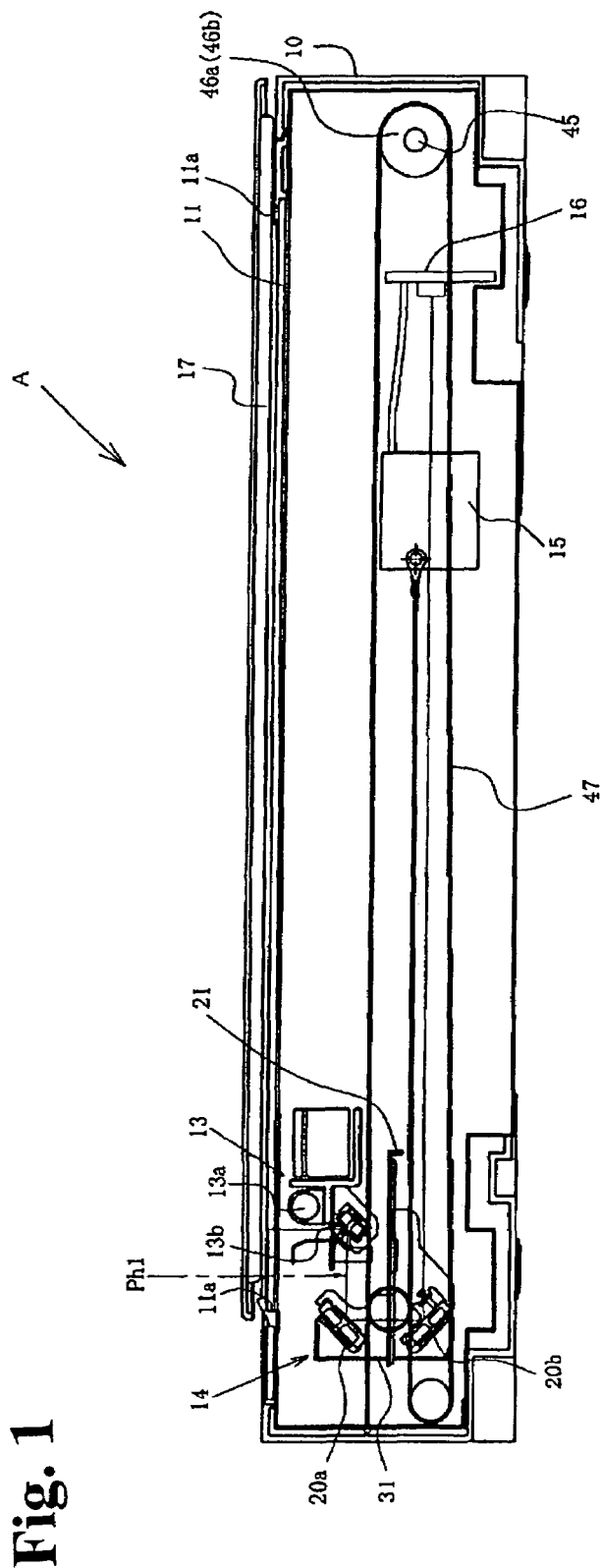
FIG. 1 is a diagram illustrating an entire image reading device containing a reflection mirror unit in accordance with the present invention.
Figure 2:
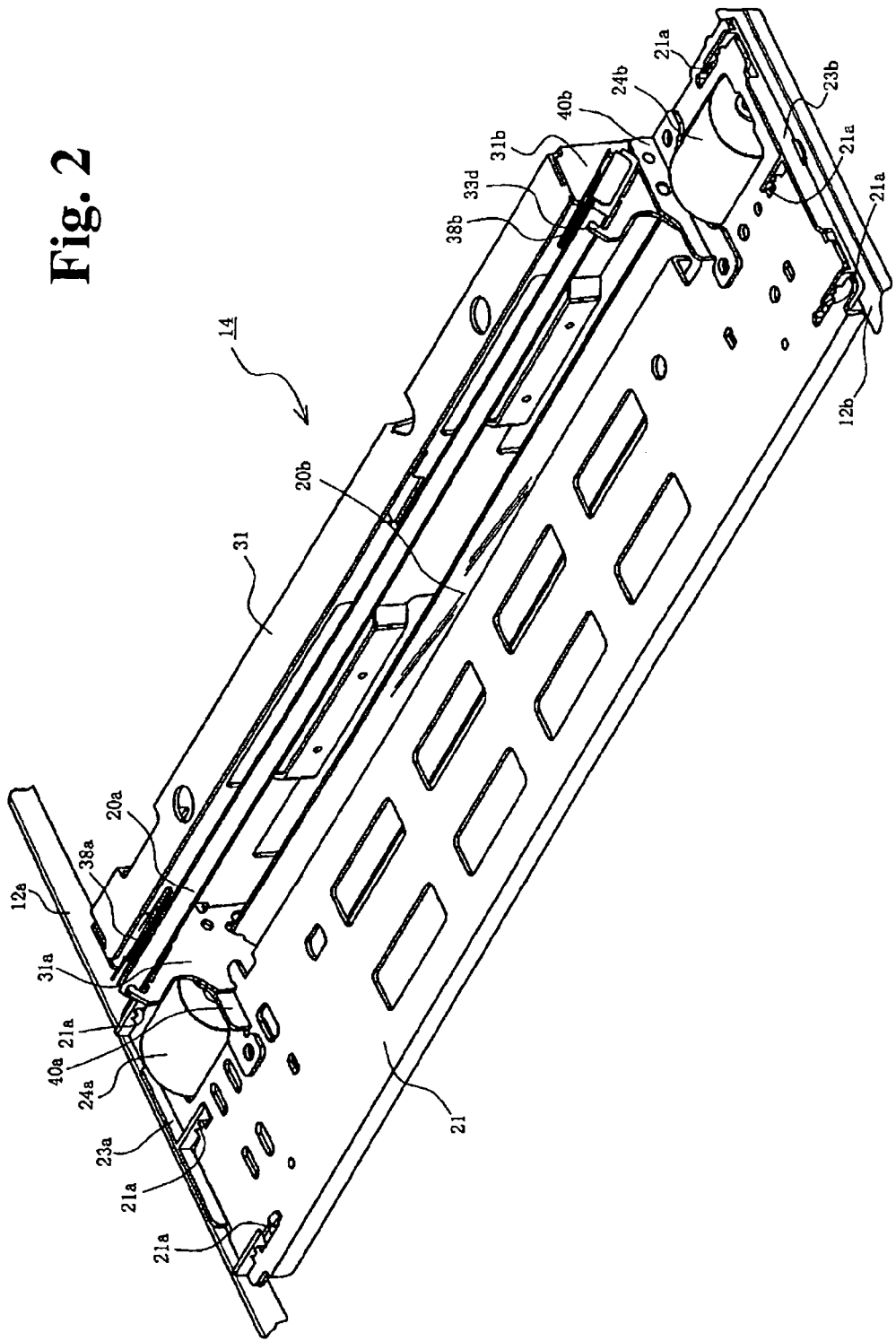
FIG. 2 is a perspective view illustrating a scanning mechanism in accordance with the present invention.

The present invention will be described below in detail with reference to preferred embodiments. FIG. 1 is a diagram illustrating an entire image reading device containing a reflection mirror unit in accordance with the present invention. FIG. 2 is a perspective view illustrating a scanning mechanism in the image reading device.

First, description will be given of the configuration of an image reading device A in accordance with the present invention. The image reading device A is composed of an armor casing 10, a glass platen 11 located on a part of the armor casing 10, a guide rail member 12 located inside the armor casing 10, a first carriage 13 and a second carriage 14 slidably supported by the guide rail member 12, a condensing lens 15, and photoelectric conversion means 16.

The illustrated image reading device A has a monocoque structure. The armor casing 10 has sidewalls rigidly composed of a synthetic resin or the like, and a top surface to which the glass platen 11 is fixed and on which a document cover 17 is provided so as to be freely opened and closed. A flange 11a is provided around the glass platen 11 and has an X-X reference (main-scanning-direction reading reference) and a Y-Y reference (sub-scanning-direction reading reference) which are used when a document is set using the flange 11a The guide rail member 12 is mounted parallel to the glass platen 11. A pair of the illustrated guide rails 12 is arranged in a longitudinal direction (sub-scanning direction) of the glass platen 11 as shown FIG. 2. A first guide rail member 12a and a second guide rail member 12b are parallel to each other and are arranged parallel to a surface of the glass platen 11. Both guide rail members 12a, 12b are composed of a member having an L or U-shaped cross section. Alternatively, the guide rail member 12 may be composed of a rod member having a circular cross-section. The guide rail member is hereinafter simply referred to as the "guide rail".

The guide rail 12 slidably supports the first carriage 13 and the second carriage 14. First, the first carriage 13 is composed of, for example, a rectangular housing of a synthetic resin. The first carriage 13 contains a linear light source 13a such as a fluorescent lamp and a first reflection mirror 13b that polarizes light reflected by a document on the glass platen 11 which has been irradiated with the light. Thus, the first carriage 13 has a housing portion for the linear light source 13a and a housing portion for the first reflection mirror 13b, the housing portions are formed by molding, for example, a heat-resistant synthetic resin.

A second reflection mirror 20a and a third reflection mirror 20b are mounted on the second carriage 14; the second reflection mirror 20a receives light (in the figure, a horizontal optical path Ph1) from the first reflection mirror 13b.

Now, a driving system for the first and second carriages 13, 14 will be described. The first and second carriages 13, 14 are driven by driving means such as a stepping motor. Specifically, a lateral pair of winding pulleys 46a, 46b is provided around a driving shaft 45, which is the driving means. A wire 47 is wound around the winding pulleys 46a, 46b. An intermediate portion of the wire 47 is fixed to the carriage 14, and a leading end of the wire 47 is wound around movable pulleys 24a, 24b of the reflection mirror unit constituting the second carriage 14. Thus, rotation of the driving shaft 45 moves the first and second carriage 13, 14 along the glass platen 11. The second carriage 14 moves at a speed half of that of the first carriage 13. The first carriage 13 and the second carriage (reflection mirror unit) 14 are accurately guided on the guide rail 12 so as to be able to reciprocate along the glass platen 11. Reflected light from the second carriage 14 is projected on the photoelectric conversion means 16 by the image formation lens 15, located on a bottom surface (bottom side) of the device.

A detailed description will be given of a first embodiment and a second embodiment of the reflection mirror unit 14 in accordance with the present invention.

Figure 3:
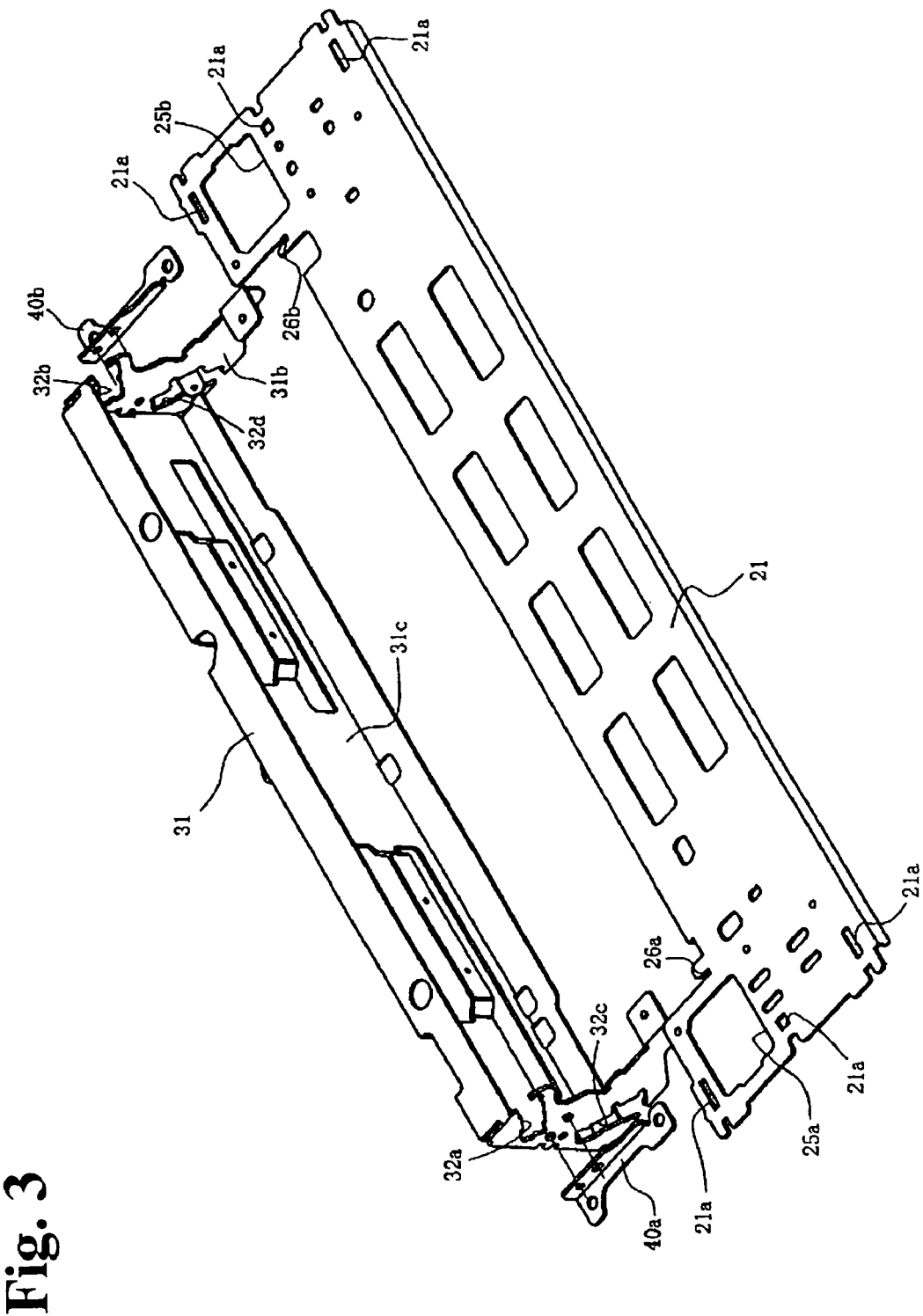
FIG. 3 is an exploded perspective view of the reflection mirror unit in accordance with a first embodiment.
Figure 4:
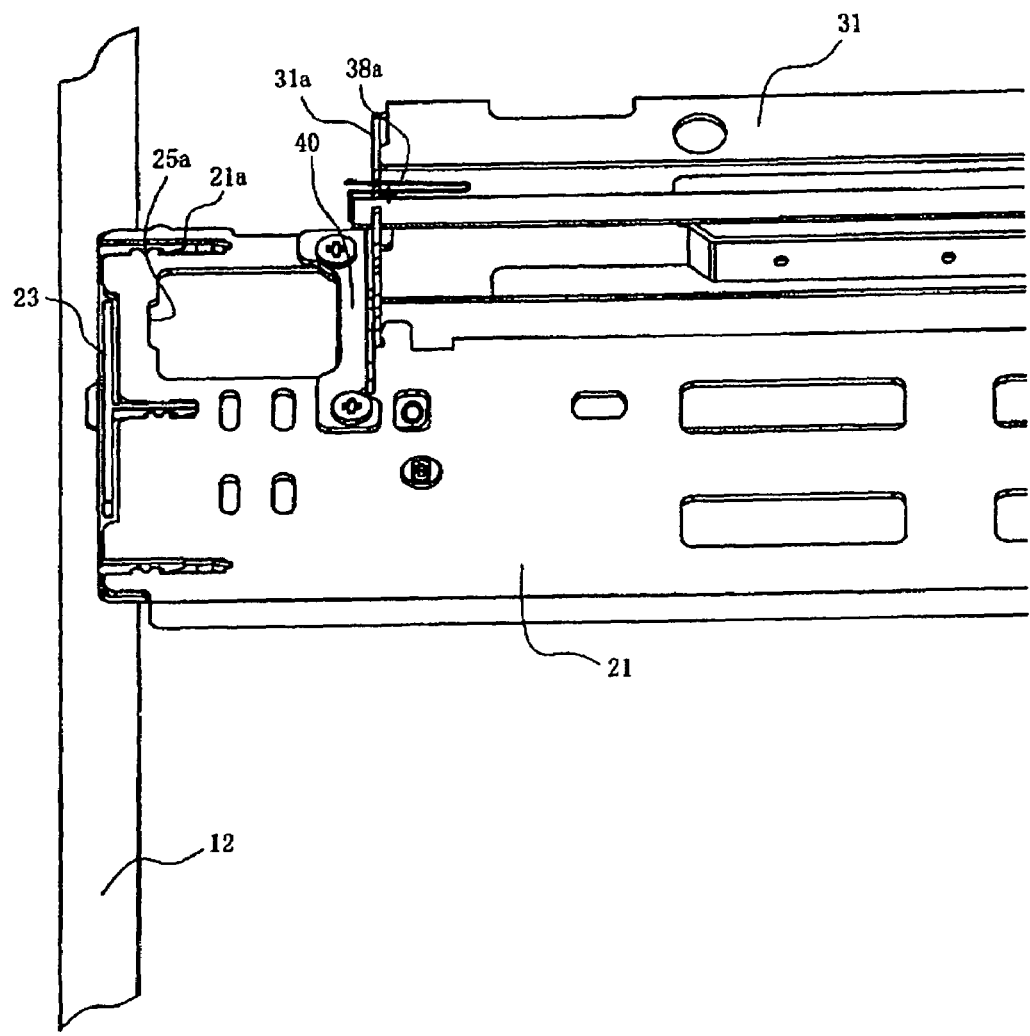
FIG. 4 is a diagram showing an upper part of the reflection mirror unit in accordance with the first embodiment.

First, description will be given of the configuration of the reflection mirror unit 14 in accordance with the first embodiment. As shown in FIG. 3, the reflection mirror unit 14 is composed of a base frame 21 and a mirror support frame 31.

The second reflection mirror 20a and third reflection mirror 20b supported in predetermined postures are moved under a document on the glass platen 11 along the guide rail 12 in the sub-scanning direction. The document is thus read. Thus, both frames 21, 31 need to be rigid and light and are formed of a metal plate of a high mechanical strength or the like.

The base frame 21 is formed by appropriately press-working a metal plate such as an iron-aluminum alloy as shown in FIG. 3 and is formed to be slightly longer than the image reading width (main scanning direction length). The base plate 21 has reinforcing bent edges formed at the periphery thereof by press-working so as to withstand an external force such as a shock. Further, the mirror support frame 31 is assembled to the base frame 21 to ensure the strength of a mirror housing. The base frame 21 is engagingly and slidably supported by each of the first and second guide rails 12a and 12b. Thus, in the illustrated reflection mirror unit, the base frame 21 is slidably supported simply by placing rail sliding portions 23a, 23b of the base frame 21 on the first and second guide rails 12a, 12b. The rail sliding portions 23a, 23b are composed of, for example, spacer members of a lubricating resin such as a Teflon (registered trade mark) resin. The resin rail sliding portion 23 is fitted into an installation hole 21a formed on the base frame 21 for integration.

Pulley installation holes 25a, 25b in which the movable pulleys 24a, 24b, described below, are installed are formed on the base frame 21 at the opposite ends thereof in the main scanning direction. Slit fitting holes 26 (26a, 26b) are formed on the base frame 21 at the opposite ends thereof in the main scanning direction. Each of the fitting holes 26a, 26b have sandwiching sidewall surfaces 28a, 28b between which corresponding bent pieces 31a, 31b of the mirror support frame 31, described below, are sandwiched, and an abutting surface 29a against which the bent pieces 31a, 31b are abutted for regulation. The sidewall surfaces are formed to define the positions of the bent pieces 31a, 31b. Pulley brackets (not shown) and the movable pulleys 24a, 24b, borne by the pulley brackets, are set in the pulley installation holes 25a, 25b. The mirror support frame 31 is fittingly connected to the slit-like fitting holes 26a, 26b.

The mirror support frame 31 is formed by appropriately press-working a metal plate such as an iron-aluminum alloy as shown in FIG. 3. The mirror support frame 31 is composed of an U-sectioned stay member that is slightly longer than the image reading width in the main scanning direction length (the lateral direction of FIG. 3). The second and third reflection frames 20a, 20b are mounted on the mirror support frame 31, which is coupled to the base frame 21 to constitute the reflection mirror unit 14. Thus, the bent pieces 31a, 31b are formed at the opposite ends of the mirror support frame 31 in the main scanning direction; the bent pieces 31a, 31b are bent so as to extend substantially orthogonally to the U-sectioned stay portion 31c and to lie opposite each other.

Mirror installation holes 32a, 32c are formed in the bent piece 31a, and mirror installation holes 32b, 32d are formed in the bent piece 31b. The mirror installation holes 32a, 32c are located opposite to the mirror installation holes 32b, 32d. The mirror installation holes 32a to 32d have positioning members 33a, 33b, 33c, 33d, respectively; the positioning members 33c, 33d abut against a surface (reflection surface) of the second reflection mirror 20a to define the position of the reflection mirror 20a, and the positioning members 33a, 33b abut against a surface of the second reflection mirror 20b to define the position of the reflection mirror 20b (see FIG. 5(a)). In the figure, the positioning member 33a and the adjustment screw 33b, positioning the third reflection mirror 20b, adjustably position the surface of the mirror. The positioning members 33c and 33d, positioning the second reflection mirror 20a, are composed of projections formed on the bent pieces 31a, 31b.

As described above, the mirror support frame 31 has the bent pieces 31a, 31b, the mirror installation holes 32a to 32d, formed on the bent pieces 31a, 31b, and the positioning members 33a to 33b, also formed on the bent pieces 31a, 31b, to support the pair of reflection mirrors 20a and 20b. Accordingly, the mirror installation holes 32a to 32d, the positioning members 33a to 33d, or the mounting portions thereof are integrally formed by appropriately press-working a metal plate or the like, resulting in high dimensional precision. Leaf springs 38a, 38b are provided on a back surface of the second reflection mirror 20a, and leaf springs 38c, 38d are provided on a back surface of the third reflection mirror 20b. The leaf springs 38a, 38b, 38c, 38d bias the mirror back surfaces toward the positioning members 32a to 33d to fixedly hold the reflection mirrors.

Figure 5A:
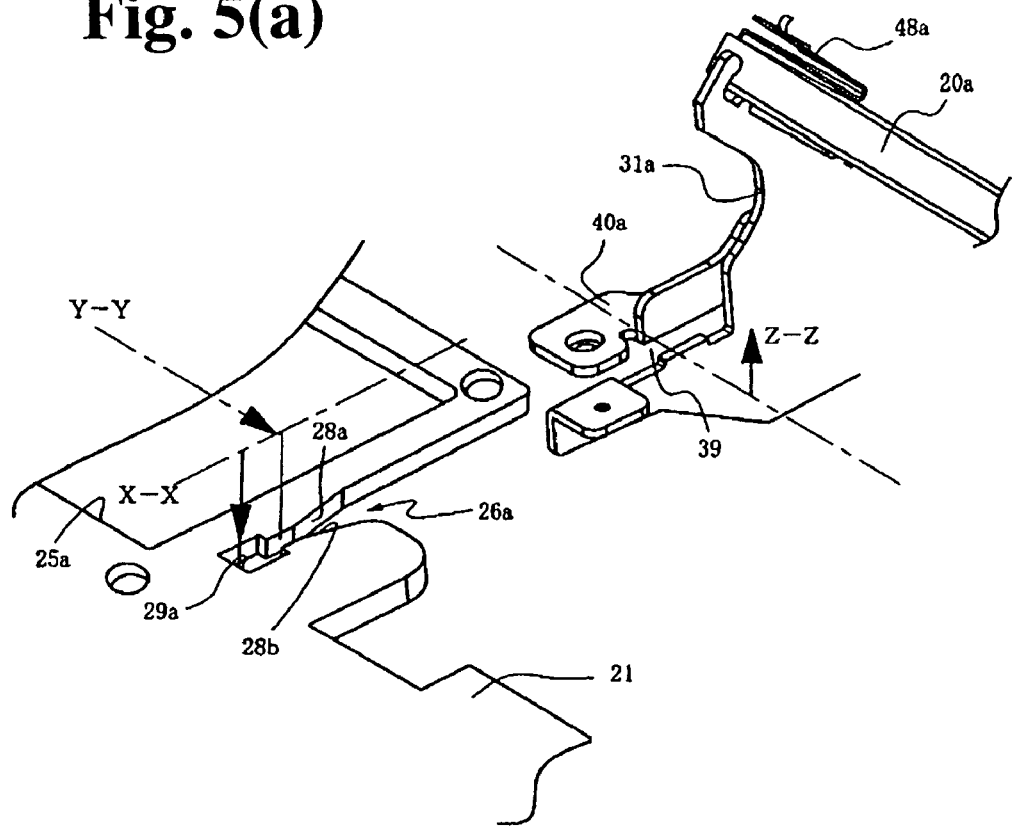
FIGS. 5(*a*) and 5(*b*) are diagrams illustrating how the reflection mirror unit in accordance with the first embodiment is fitted, wherein FIG. 5(*a*) is an enlarged view of an essential part of a mirror support frame and a base frame, and FIG. 5(*b*) is a side view of the reflection mirror unit.
Figure 5B:
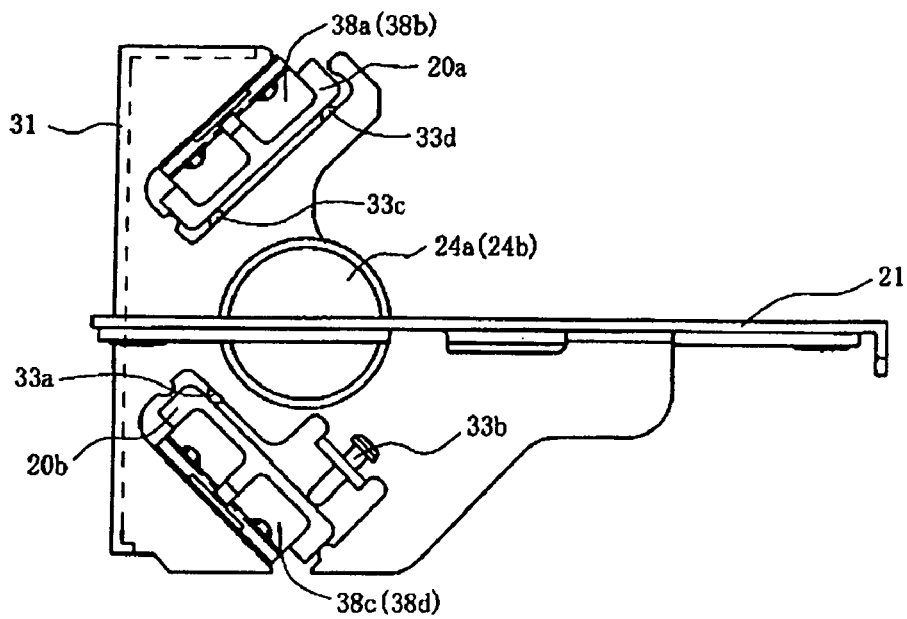

A slit-like recessed groove 39 is formed in the mirror support frame 31 to determine reference positions (in a Z-Z direction in FIG. 5(a)) for the second and third reflection mirrors 20a, 20b. The slit-like recessed groove 39 is composed of a reference wall formed in the mirror support frame 31 by press-cutting and an L-shaped fixing piece 40 (40a, 40b) attached to the mirror support frame 31 by spot welding or the like. The L-shaped fixing piece 40 (40a, 40b) may be formed by integrally bending the mirror support frame 31. Thus, the mirror support frame 31 has the bent pieces 31a, 31b, to which the pair of the second and third reflection mirrors 20a, 20b is mounted, and the slit-like recessed groove 39, which defines the reference position (in the Z-Z direction in FIG. 5(a)) for each mirror.

The base frame 21 and the mirror support frame 31 are integrated together as follows. The slit-like fitting holes 26 (26a, 26b) are formed on the base frame 21 at the opposite ends in the main scanning direction. The slit-like recessed grooves 39 are formed in the mirror support frame 31 at the opposite ends in the main scanning direction. The positional precision of the slit-like fitting hole 26 and the slit-like recessed groove is ensured by appropriate press-cutting. Thus, the base frame 21 and the mirror support frame 31 are combined together so that the slit-like fitting holes (26a, 26b) are fitted into the slit-like recessed groove 39. After the combination, the frames are fixed together using screw holes formed in the L-shaped fixing pieces 40 (40a, 40b).

As described above, the second and third reflection mirrors 20a and 20b are assembled to the mirror support frame 31 combined with the base frame 21 to form the reflection mirror unit 14. Then, the second and third reflection mirrors 20a, 20b are provided with mechanical strength against a bending force in the main scanning direction by the U-sectioned stay portion 31c of the mirror support frame 31 and the bent edges of the base frame 21. This structure allows the reflection mirrors to be rigidly held without being damaged or bent even when the reflection mirrors receive an external force such as a shock.

Further, the bent pieces 31a, 31b of the mirror support frame 31 are fitted into the slit-like fitting holes 26a, 26b, respectively, on the base frame 21. The position of each of the bent pieces 31a, 31b is defined by the sandwiching sidewall surfaces 28a, 28b, forming each of the fitting holes 26a, 26b. Consequently, after combining with the base frame 21, the position of the lateral pair of the bent pieces 31a, 31b is defined by the sandwiching sidewall surface 28a, 28b to prevent the base ends of the bent pieces 31a, 31b from being bent. Therefore, even when the mirror support frame 31 is formed of a relatively thin metal plate, the bent pieces are prevented from being bent by a shock or the like during an assembly or an operation. Thus, the mirror support frame 31 can be formed to be light in weight, using a relatively thin metal plate, which is easy to machine. Since the lateral pair of the bent pieces 31a, 31b, which are relatively easy to bend, has its position defined by the sandwiching sidewall surfaces 28a, 28b of the base frame 21, the second and third reflection mirrors 20a, 20b held by the mirror support frame 31 are prevented from being mounted with an inclination in the main scanning direction.

Moreover, since the slit-like fitting hole 26 (26a, 26b) comprises the abutting surface 29a, the slit-like recessed groove 39 in the lateral pair of bent pieces 31a, 31b is abutted against the abutting surface 29a to define the position of the bent piece 31a, 31b. This prevents the mirror support frame 31 from being mounted on the base frame 21 and inclined in the main scanning direction. Consequently, the mirror support frame 31 is mounted on the base frame 21 supported by the guide rail member 12, in the correct posture without inclining.

On the other hand, the mirror support frame 31 has the slit-like recessed grooves 39 formed at the reference positions for the second and third reflection mirrors 20a, 20b. Thus, fitting the slit-like recessed groove 39 into the slit-like fitting hole 26 (26a, 26b) in the base frame 21 allows the second and third reflection mirrors 20a, 20b to be supportively arranged opposite to each other in the vertical direction across the base frame 21.

As described above, in the reflection mirror unit 14 in accordance with the present invention, the pair of reflection mirrors 20a, 20b can be rigidly held without inclining in the main scanning direction or the sub-scanning direction by fitting the slit-like fitting holes 26, formed in the base frame 21, into the slit-like recessed grooves 39, formed in the opposite bent pieces 31a, 31b. Further, the opposite second and third reflection mirrors 20a, 20b can be accurately arranged on the base frame 21. This structure enables the reference positions to be accurately and easily determined by appropriately press-working the base frame 21 and the mirror support frame 31.

Now, description will be given of the reflection mirror unit 14 in accordance with the second embodiment. Here, the reflection mirror unit 14 is denoted by reference numeral 114 so as to avoid confusing this reflection mirror unit with the reflection mirror unit 14 in accordance with the first embodiment.

Figure 6A:
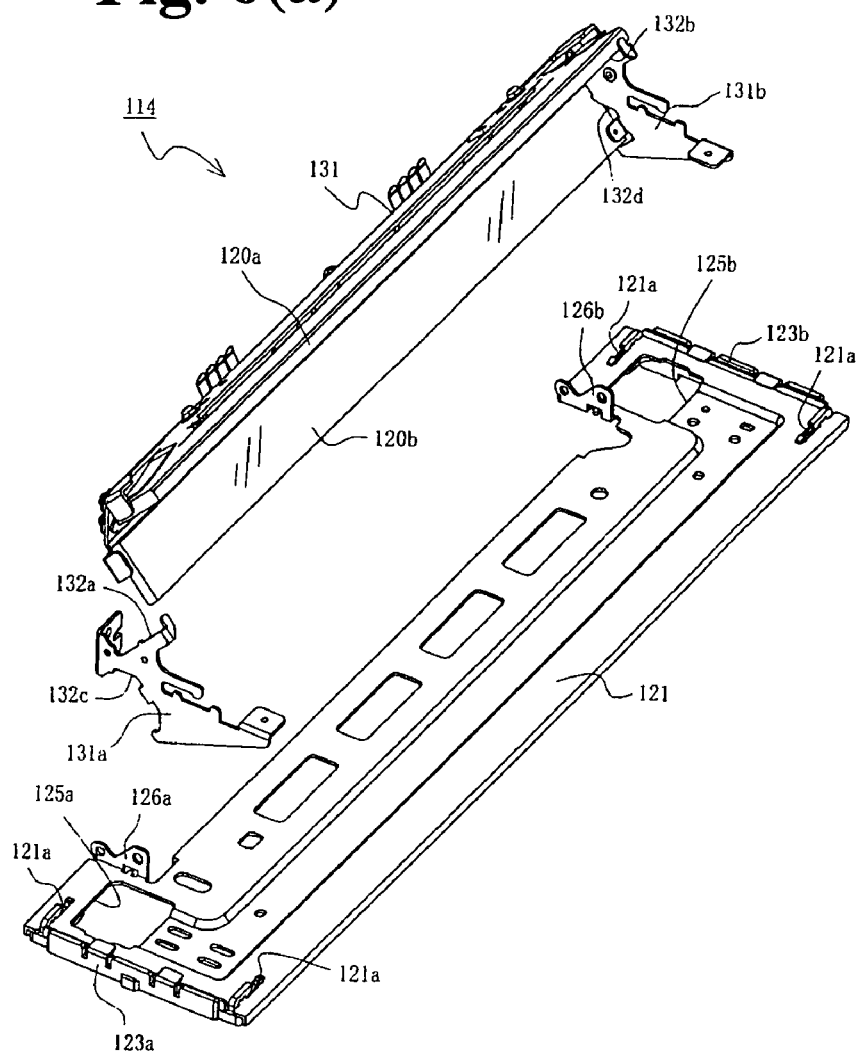
FIGS. 6(*a*) and 6(*b*) are diagrams illustrating a reflection mirror unit in accordance with a second embodiment, wherein FIG. 6(*a*) is a partial perspective view, and FIG. 6(*b*) is a detailed diagram illustrating a junction between a bracket member and a base frame.
Figure 6B:
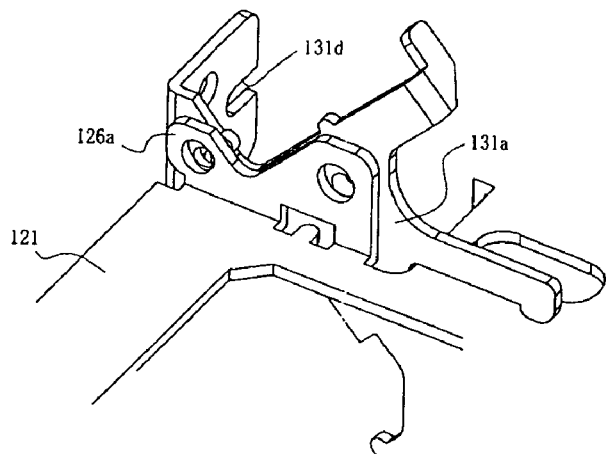

As shown in FIG. 6(a), the reflection mirror unit 114 is composed of a base frame 121 and a mirror support frame 131. The reflection mirror unit 114 supports a second reflection mirror 120a and a third reflection mirror 120b described above in predetermined postures and move the reflection mirrors 120a and 120b under a document on the platen 11 in the sub-scanning direction along the guide rail 12, described above, for reading. Thus, the frames 121 and 131 need to be configured to be rigid and light and is thus formed of a metal plate of high mechanical strength.

The base frame 121 is formed by appropriately press-working a metal plate such as an iron-aluminum alloy as shown in FIG. 6(a) and is formed to be slightly longer than the image reading width of the platen 11 (the length in the main scanning direction length). The base frame 121 has reinforcing bent edges formed at the periphery thereof by press-working so as to withstand an external force such as a shock. Further, the mirror support frame 131, described below, is assembled to the base frame 121 to ensure the strength of the mirror housing. The base frame 121 is engagingly and slidably supported by each of a first guide rail 112a and a second guide rail 112b described above. Thus, in the illustrated reflection mirror unit, the base frame 121 is slidably supported simply by placing rail sliding portions 123a, 123b of the base frame 121 on the first and second guide rails 112a, 112b. The rail sliding portions 123a, 123b are composed of, for example, spacer members of a lubricating resin such as a Teflon (registered trade mark) resin. The resin rail sliding portion 123 is fitted into an installation hole 121a formed in the base frame 21 for integration.

Pulley installation holes 125a, 125b, in which movable pulleys 124a, 124b described below are installed, are formed on the base frame 121 at the opposite ends thereof in the main scanning direction. A lateral pair of bent coupling pieces 126a, 126b is provided on the base frame 121 so that the bent coupling pieces 126a and 126b are located opposite and away from each other in the main scanning direction. A bent piece 131b and a bracket member 131a of the mirror support frame 131, described below, are coupled to the bent coupling pieces 126a and 126b, respectively. Pulley support members (not shown) and the movable pulleys 124a, 124b, borne by the pulley support members, are set in the pulley installation holes 125a, 125b.

Figure 7:
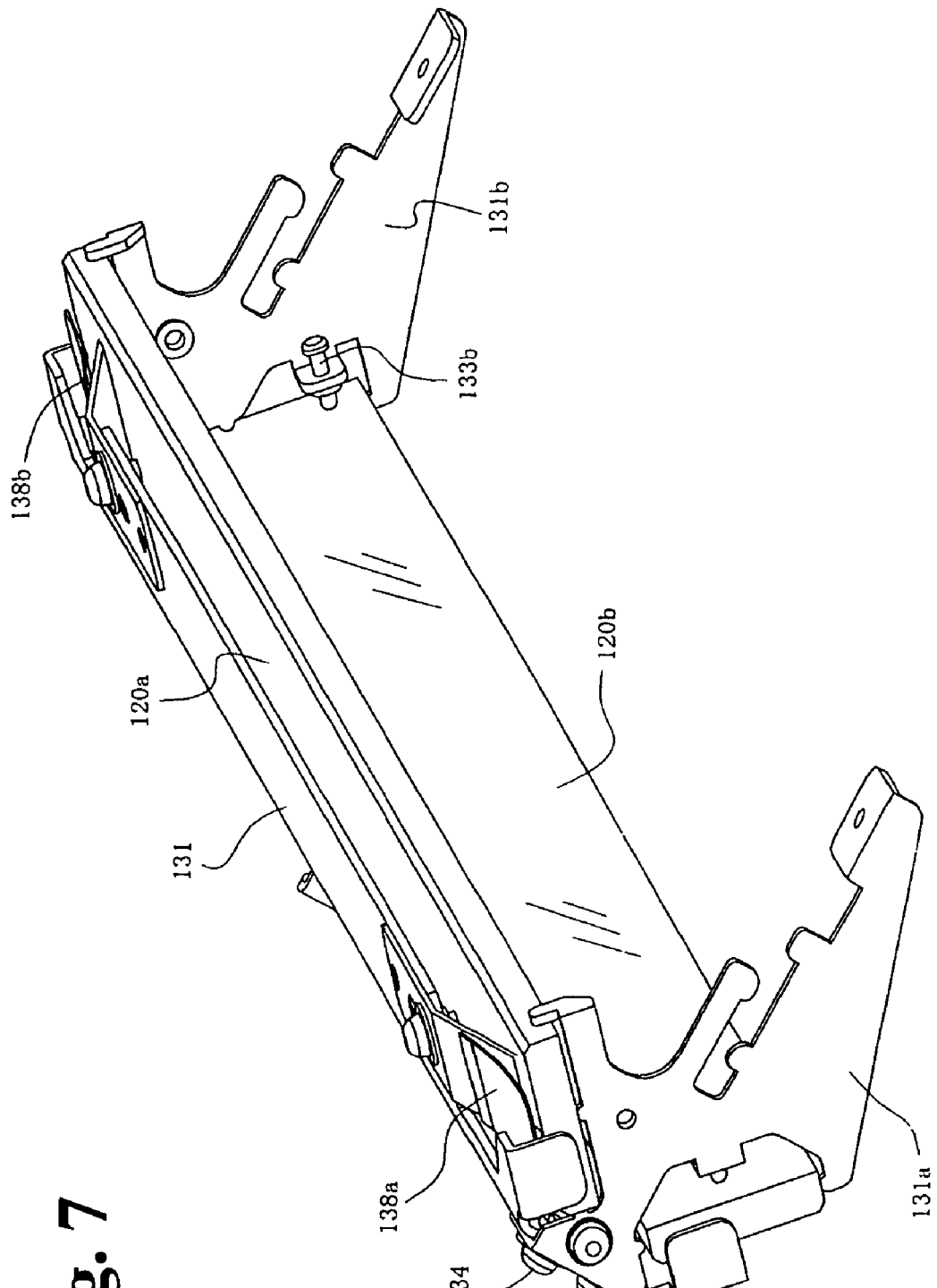
FIG. 7 is a perspective view illustrating a mirror support frame in the reflection mirror unit in accordance with the second embodiment.

The mirror support frame 131 is formed by appropriately press-working a metal plate such as an iron-aluminum alloy as shown in FIG. 7. The mirror support frame 131 is composed of an U-sectioned plate-like stay member that is slightly longer than the image reading width in the main scanning direction length (the lateral direction of FIG. 7). The second and third reflection frames 120a, 120b are mounted on the mirror support frame 131, which is coupled to the base frame 121 to constitute the reflection mirror unit 14. Thus, the mirror support frame 131 has the bent piece 131b and the bracket member 131a, described below.

Figure 10:
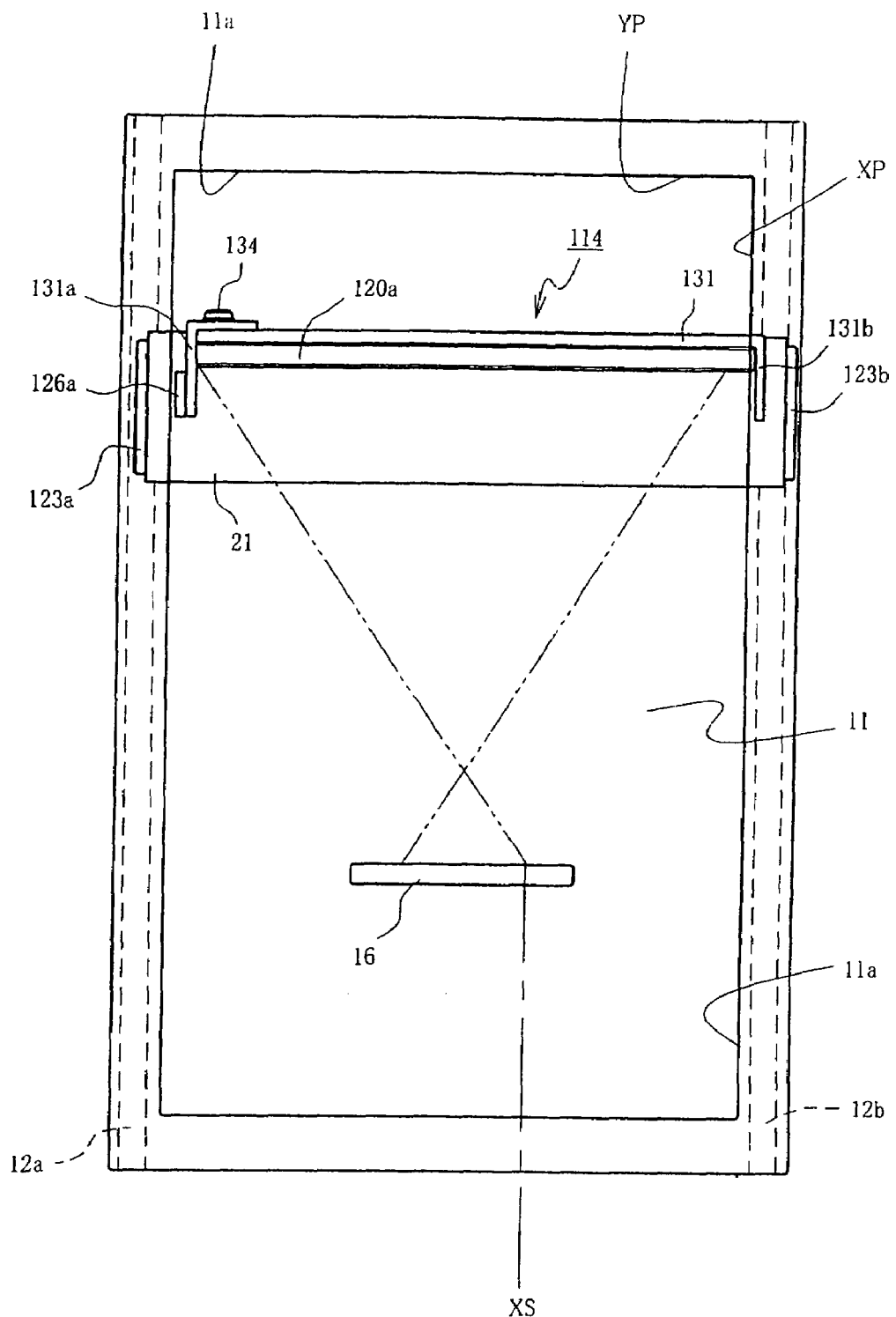
FIG. 10 is a diagram showing a positional relationship with a reading reference in the image reading device.

The bent piece 131b and the bracket member 131a are arranged opposite each other in the main scanning direction so as to support end surfaces of the second and third reflection mirrors 120a, 120b. Mirror installation openings 132b and 132d are formed in the bent piece 131b, and mirror installation openings 132a and 132c are formed in the bracket member 131a. The bent piece 131b is formed by integrally bending the stay portion of the mirror support frame 131. The bracket member 131a is threadably engaged with the stay portion 131c so as to be movably adjustable in the main scanning direction. The bent piece 131b and the bracket member 131a are formed substantially orthogonally to and continuously with the stay portion 131c. The positional relationship between the bent piece 131b and the bracket member 131a in the main scanning direction is as shown in FIG. 10, described below.

Figure 8A:
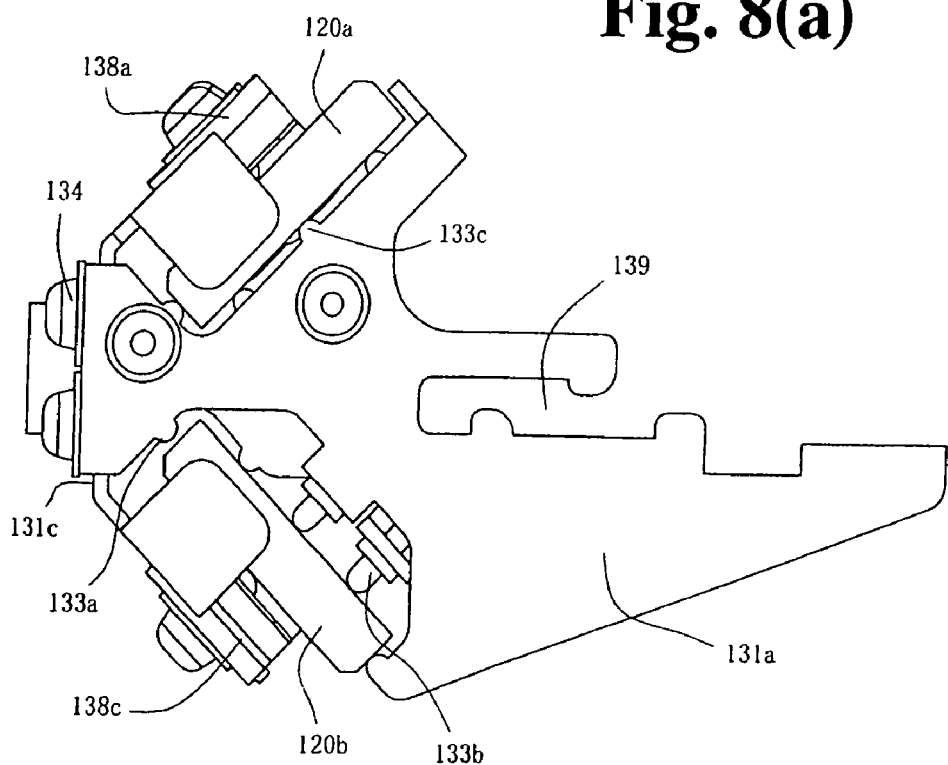
FIGS. 8(*a*) and 8(*b*) are side views of the reflection mirror unit in accordance with the second embodiment, wherein FIG. 8(*a*) is a side view of one end of the reflection mirror unit, and FIG. 8(*b*) is a side view of the other end of the reflection mirror unit.
Figure 8B:
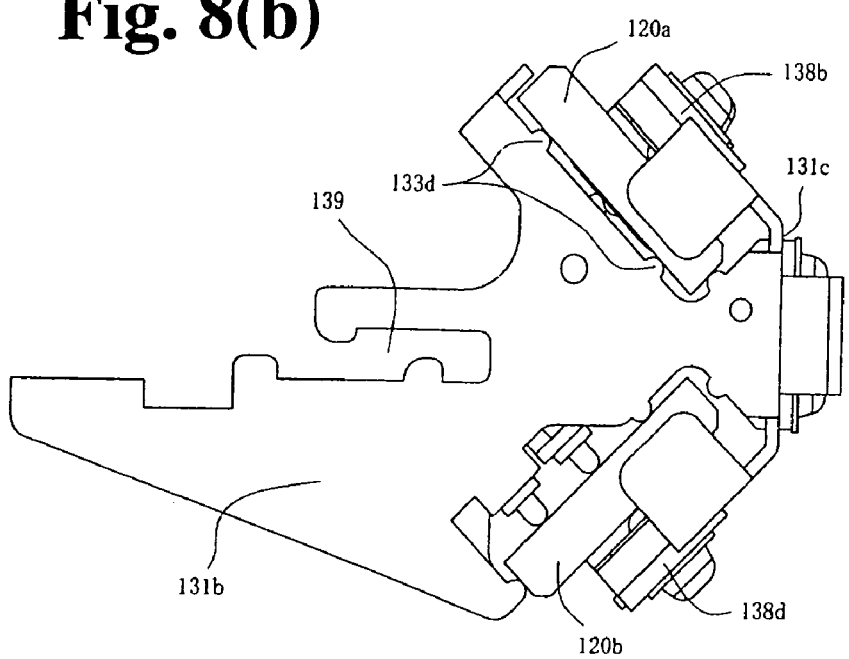

The mirror installation openings 132a to 132d, formed on the bent piece 131d and the bracket member 131a, have positioning members 133a, 133b, 133c, 133d, respectively; the positioning members 133c, 133d abut against a surface (reflection surface) of the second reflection mirror 120a to define the position of the reflection mirror 120a, and the positioning members 133a, 133b abut against a surface of the second reflection mirror 120b to define the position of the reflection mirror 120b (see FIG. 8(a)) in the figure, the positioning member 133a and the adjustment screw 133b, positioning the third reflection mirror 120b, adjustably position the surface of the mirror. The positioning members 133c and 133d, positioning the second reflection mirror 120a, are composed of projections formed on the bent pieces 131a, 131b. As described above, the mirror support frame 131 has the bracket member 131a, the bent piece 131b, the mirror installation openings 132a to 132d, formed in the bent pieces 131a and 131b, and the positioning members 133a to 133b, formed in the openings, to support the pair of reflection mirrors 120a and 120b.

Accordingly, the mirror installation holes 132a to 132d, the positioning members 133a to 133d, or the mounting portions thereof are integrally formed by appropriately press-working a metal plate or the like, resulting in high dimensional accuracy. A slot 131d is formed on the bracket member 131a in the main scanning direction. The bracket member 131 is fixed to the stay portion 131c by threading a fixing screw 134 into the slot 131d. Leaf springs 138a, 138b are provided on a back surface of the second reflection mirror 120a, and leaf springs 138c, 138d are provided on a back surface of the third reflection mirror 120b. The leaf springs 138a, 138b, 138c, 138d bias the mirror back surfaces toward the positioning members 133a to 133d to fixedly hold the reflection mirrors 120a, 120b in the mirror installation openings 132.

Figure 9:
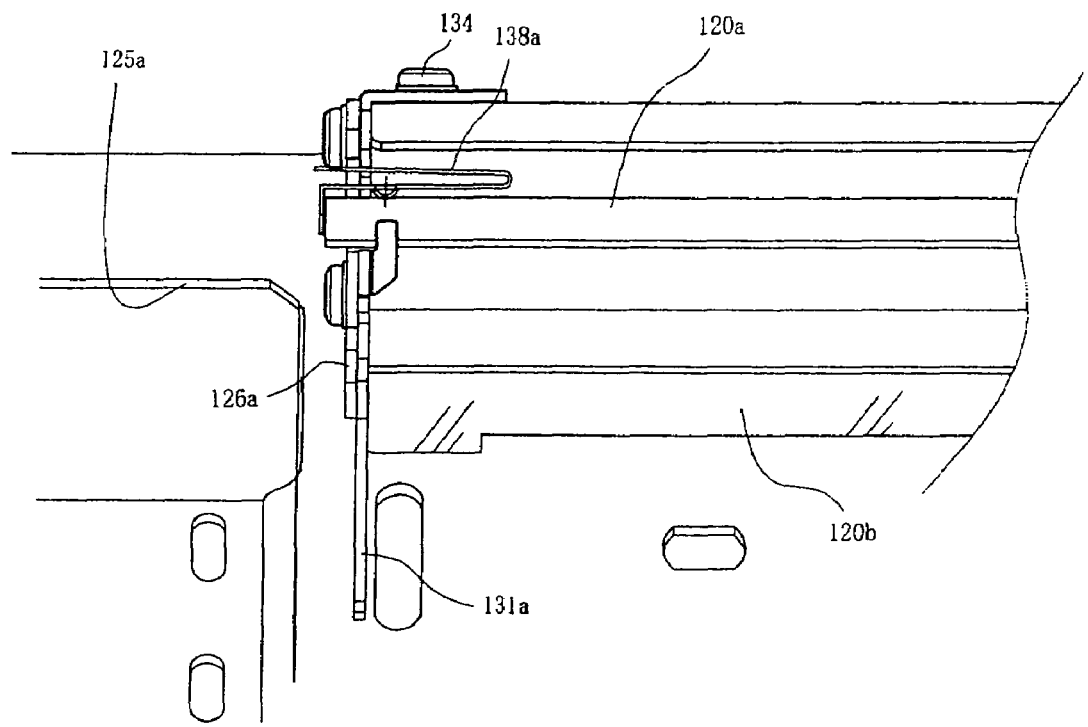
FIG. 9 is a detailed diagram illustrating a junction between the bracket member and the base frame in the reflection mirror unit in accordance with the second embodiment.

Each of the bent piece 131b and bracket member 131a, connected to the mirror support frame 131 as described above, has a slit-like recessed groove 139 that determines reference positions for the second and third reflection mirrors 120a, 120b. Fitting the slit-like recessed grooves 139 into the base frame 121 allows the second and third reflection mirrors 120a, 120b to be positioned on the base frame 121 with a predetermined distance between the reflection mirrors 120a and 120b. The second and third reflection mirrors 120a, 120b are then fixed to the bent coupling pieces 126a, 126b with screws or the like. The second and third reflection mirrors 120a, 120b are thus integrated together as shown in FIG. 9.

Therefore, the base frame 121 and the mirror support frame 131 are integrated together as described below. First, the pair of bent coupling pieces 126a, 126b is formed on the base frame 121. The bent piece 131b and bracket member 131a of the mirror support frame 131 are fixedly positioned at the bent coupling pieces 126a, 126b, respectively. At this time, the bent piece 131b of the mirror support frame 131 is used as a reference, and the position of the opposite bracket member 131 is adjusted using a fixing screw 134.

As described above, the second and third reflection mirrors 120a and 120b are assembled to the mirror support frame 131 combined with the base frame 121 to form the reflection mirror unit 14. Then, the second and third reflection mirrors 120a, 120b are provided with mechanical strength against a bending force in the main scanning direction by the U-sectioned stay portion 131c of the mirror support frame 131 and the bent edges of the base frame 121. This structure allows the reflection mirrors to be rigidly held without being damaged or bent even when the reflection mirrors receives an external force such as a shock.

Further, the bent piece 131b, formed at one end of the mirror support frame 131, has its position defined by the bent coupling piece 126b of the base frame 121. The position of the bracket member 131a, located at the other end of the mirror support frame 131, is adjusted using the fixing screw 134 to fixedly position the bracket member 131a at the bent coupling piece 126a of the base frame. Consequently, after the combining with the base frame 121, the bent coupling pieces 126a, 126b are used for positional limitations, preventing the base end of the lateral pair of bent pieces 131b and the bracket member 131a from being bent. Thus, even when the mirror support frame 131 is formed of a relatively thin metal plate, the bent piece is prevented from being bent by a shock or the like during assemblies or operations. This structure allows the mirror support frame 131 to be formed to be light in weight, using a relatively thin metal plate, which is easy to modify.

Now, the positional relationship between the bent piece 131b and the bracket member 131a will be described with reference to FIG. 10. As shown in FIG. 10, the flange 11a is formed around the periphery of the platen 11. In the figure, Xp is set to be a positional reference in the main scanning direction, and Yp is set to be a positional reference in the sub-scanning direction. A document is set on the platen using Xp and Yp as references. The photoelectric conversion element 16 is fixedly positioned so that a reading start reference XS for the photoelectric conversion element (line sensor) 16 aligns with the set references for the document.

In this positional relationship, the base frame 121 is engagingly placed on the guide rail 12 so that the left and right sliding portions 123a, 123b extend parallel to the positional reference Yp. The bent coupling portions 126b, formed on the base frame 121, is formed to fix the bent piece 131b of the mirror support frame 131 and to locate the end surfaces of the reflection mirrors 120a, 120b supported on the bent piece 131b, at a predetermined position outside the positional reference Xp. The other bracket member 131a, formed on the base frame 121, has its position adjusted in the main scanning direction with respect to the mirror support frame 131, in conjunction with the position of the bent piece 131b adjusted as described above. The bracket member 131a is thus fixed to the bent coupling piece 126

As described above, the reflection mirror unit 114 is composed of the pair of bent coupling pieces 126a, 126b formed on the base frame, the bent piece 131b on the mirror support frame 131, the bracket member 131a mounted to the mirror support frame 31 so as to be position-adjustable, and the pair of reflection mirrors 120a, 120b mounted between the bent piece 131b and the bracket member 131a. This enables the pair of reflection mirrors 120a, 120b to be rigidly held without inclining in the main scanning direction or the sub-scanning direction. Further, the opposite second and third reflection mirrors 120a, 120b can be accurately arranged on the base frame 121. Furthermore, accurate positions can be easily determined by appropriately press-working the base frame 121 and the mirror support frame 131.

The disclosures of Japanese patent Applications No. 2006-198593 filed on Jul. 20, 2006 and No. 2006-223846 filed on Aug. 21, 2006 are incorporated herein as references.

While the invention has been explained with reference to the specific embodiments of the invention, the explanation is illustrative, and the invention is only by appended claims.

What is claimed is:

1. A reflection mirror unit for a document on a platen, comprising:
   first and second reflection mirrors,
   a base frame comprising a plate member and having a sliding portion adapted to slidably engage a guide rail located in a sub-scanning direction for the document on the platen, and first coupling portions, and
   a mirror support frame comprising a plate member and having a mirror mounting portion for supporting the first and second reflection mirrors opposite to each other with a predetermined angle, and second coupling portions coupled with the first coupling portions by which the mirror support frame is coupled to the base frame,
   wherein the mirror mounting portion comprises a pair of opposite bent pieces formed by bending the mirror support frame so as to support opposite ends of the first and second reflection mirrors in a main scanning direction,
   the first coupling portions of the base frame comprises slit fitting holes engaging the pair of bent pieces,
   each of the slit fitting holes has sandwiching sidewall surfaces that define a distance between the pair of bent pieces in the main scanning direction and an abutting surface that defines a position of the bent piece in the sub-scanning direction, and
   each of the second coupling portions of the mirror support frame comprises a slit recessed groove formed in each of the pair of bent pieces so that when the second coupling portion is fitted into the slit-like fitting hole, the second coupling portion defines vertically opposite positions of the first and second reflection mirrors.

2. The reflection mirror unit according to claim 1, wherein the pair of bent pieces comprises a positioning member against which surfaces of the first and second reflection mirrors abut for regulation, and a biasing member that presses and biases back surfaces of the mirrors, and the position member regulating the surface of at least one of the first and second reflection mirrors is configured to be position-adjustable.

3. The reflection mirror unit according to claim 1, wherein the plate member of the base frame has a substantially flat shape,
   the mirror support frame comprises a U-sectioned stay member having the bent pieces located at opposite ends thereof in the main scanning direction,
   the first and second reflection mirrors are mounted to the bent pieces at predetermined angles so that an incident optical path is substantially parallel to a reflecting optical path, and
   the base frame and the mirror support frame are coupled together so as to form an inverted T shape by fitting the slit fitting hole into the slit recessed groove.

4. An image reading device comprising:
   the platen on which the document is placed,
   a light source unit located so as to be movable along the platen,
   the reflection mirror unit according to claim 1, said reflecting unit guiding light applied to the document by the light source unit and then reflected by the document, onto predetermined photoelectric conversion means,
   first driving means for moving the light source unit in the sub-scanning direction along the document on the platen at a predetermined speed, and
   second driving means for moving the reflection mirror unit in the sub-scanning direction at a speed that is half of a speed at which the light source unit is moved.

5. A reflection mirror unit for a document on a platen, comprising:
   first and second reflection mirrors,
   a base frame comprising a plate member and having a sliding portion adapted to slidably engage a guide rail member located in a sub-scanning direction for the document on the platen, and coupling portions, and
   a mirror support frame coupled to the coupling portions of the base frame, said mirror support frame comprising a plate member and having a stay portion that supports the first reflection mirror and the second reflection mirror and a mirror end surface support portion extending to the stay portion,
   wherein the mirror end surface support portion comprises a bent piece formed by bending the stay portion and a bracket member mounted on the stay portion so as to be position-adjustable in a main scanning direction,
   the bent piece is located to support a reading reference end side surface of each reflection mirror in the main scanning direction, the bracket member being located to support the other end surface of the reflection mirror, and
   the bent piece and the bracket member are fixed to the respective coupling portions of the base frame.

6. The reflection mirror unit according to claim 5, wherein each of the bent piece and the bracket member formed on the mirror support frame comprises a positioning reference surface against which surfaces of the first and second reflection mirrors abut for regulation and a biasing member that presses and biases back surfaces of the mirrors.

7. The reflection mirror unit according to claim 5, wherein the plate member of the base frame has a substantially flat shape,
   the mirror support frame comprises the stay member with a U-section and the mirror end surface support portions formed at opposite ends of the stay portion,
   the first and second reflection mirrors are mounted to the mirror end surface support portions at predetermined angles so that an incident optical path is substantially parallel to a reflecting optical path, and
   the base frame and the mirror support frame are coupled together so as to form an inverted T shape.

8. The reflection mirror unit according to claim 5, wherein the coupling portions provided on the base frame comprise a pair of bent coupling pieces bent with a predetermined distance set between the bent coupling pieces so as to define positions of the reflection mirrors in the main scanning direction.

9. An image reading device comprising:
   the platen on which the document is placed,
   a light source unit located so as to be movable along the platen,
   the reflection mirror unit according to claim 5, said reflection mirror unit guiding light applied to the document by the light source unit and then reflected by the document, onto predetermined photoelectric conversion means,
   first driving means for moving the light source unit in the sub-scanning direction along the document on the platen at a predetermined speed, and
   second driving means for moving the reflection mirror unit in the sub-scanning direction at a speed that is half of a speed at which the light source unit is moved.

* * * * *